US005405589A

United States Patent [19]

Phillips

[11] Patent Number: 5,405,589

[45] Date of Patent: Apr. 11, 1995

[54] PRODUCTION OF SELENIUM-72 AND ARSENIC-72

[75] Inventor: Dennis R. Phillips, Los Alamos, N. Mex.

[73] Assignee: The Regents of the University of California, Alameda, Calif.

[21] Appl. No.: 297,459

[22] Filed: Aug. 29, 1994

Related U.S. Application Data

[62] Division of Ser. No. 756,022, Sep. 6, 1991, Pat. No. 5,204,072.

[51] Int. Cl.[6] ........................ C01G 57/00; C01G 28/00

[52] U.S. Cl. ........................................ 423/2; 423/249; 423/510; 423/DIG. 7; 376/158

[58] Field of Search ............. 423/2, 249, 510, DIG. 7; 376/158; 210/682, 688, 759; 156/DIG. 72, DIG. 81; 203/5

[56] References Cited

U.S. PATENT DOCUMENTS

| | | | |
|---|---|---|---|
| 4,130,633 | 12/1978 | Shawl et al. | 423/510 |
| 4,411,698 | 10/1983 | Badasha | 423/510 |
| 4,615,731 | 10/1986 | Thomas et al. | 423/510 |
| 4,663,141 | 5/1987 | Sonoda et al. | 423/510 |

OTHER PUBLICATIONS

Ragnar Bye, "Critical Examination of Some Common Reagents for Reducing Selenium Species in Chemical Analysis," Talahta, vol. 30, No. 12, pp. 993–996 (1983).

Regin Weinreich et al., "Production of $^{72}$Se/$^{72}$As and $^{73}$Se by Medium Energy Protons, " J. of Labelled Compounds and Radiopharmaceuticals, pp. 146–147 (1990).

Anthony L. Fellu, "The Role of Chemistry in Positron Emission Tomography," Department of Neurology, Memorial Sloan-Kettering Cancer Center, vol. 65, No. 8, pp. 665–660 (1988).

S. H. Al-Kouraishi et al, "An Isotope Generator for $^{72}$As," Int. J. of Applied Radiation & Isotopes, vol. 29, pp. 607–609 (1978).

Daniela Basile et al., "Excitation Functions and Production of Arsenic Radioisotopes for Environmental Toxicology and Biomedical Purposes, " Int. J. of Applied Radiation & Isotopes, vol. 32, pp. 403–410 (1981).

Patrick M. Grant et al., "Medium-Energy Spallation Cross Sections, 1.RbBr Irradiation with 800-MeV Protons," Int. J. of Applied Radiation and Isotopes, vol. 33, pp. 415–417 (1982).

D. R. Phillips et al., "Chemistry and Concept for an automated Se-72/As-72 Generator," Los Alamos National Laboratory LA-UR-91-517, submitted to New Trends in Radiopharmaceutical Synthesis, Quality Assurance and Regulatory Control, Plenum Publishing Corporation, New York, 1991.

D. R. Phillips et al., "Electrolytic Separation of Selenium Isotopes from Proton Irradiated RbBr Targets," Applied Radiation Isotopes, vol. 38, No. 7, pp. 521–525.

*Primary Examiner*—Ngoclan T. Mai
*Attorney, Agent, or Firm*—Richard J. Cordovano

[57] ABSTRACT

Methods and apparatus for producing selenium-72, separating it from its daughter isotope arsenic-72, and generating multiple portions of a solution containing arsenic-72 from a reusable parent substance comprised of selenium-72. The invention provides apparatus which can be located at a site where arsenic-72 is used, for purposes such as PET imaging, to produce arsenic-72 as needed, since the half-life of arsenic-72 is very short.

3 Claims, 2 Drawing Sheets

PRODUCTION OF SELENIUM-72 AND ARSENIC-72

This is a divisional of U.S. application Ser. No. 756,022, filed Sep. 6, 1991, U.S. Pat. No. 5,204,072, issued Apr. 20, 1993.

BACKGROUND OF THE INVENTION

This invention is related to the fields of chemistry and nuclear chemistry. This invention is the result of a contract with the Department of Energy (Contract No. W-7405-ENG-36).

Positron emission tomography (PET) is used to generate images of the human body which aid in medical treatment and research. The images provide structural information in high resolution and, due to biochemical activity of a radiopharmaceutical used in the imaging, the images also provide information regarding function of organs and tissues. To make a PET image, the patient is intravenously infused with a PET agent, which is a radiopharmaceutical. The biochemistry of the PET agent determines how the agent distributes within the patient's body. The PET agent undergoes radioactive decay, emitting positrons. The positrons encounter electrons very near to their point of emission and are thereby annihilated. The annihilation of each positron results in the release of two 511 keV gamma photons at very close to 180 degrees from one another. The patient is encircled by an array of gamma photon detectors. Coincidence circuitry is used to detect the gamma photons and the information is stored in a computer. After the scan is complete, an image is constructed by the computer using tomographic algorithms. The PET agent is a substance comprised of a very short-lived radioisotope such as fluorine-18, carbon-11, nitrogen-13, or oxygen-15. These radioisotopes are produced using a cyclotron, which must be in the very near vicinity of the PET facility so that the agent can be used before it undergoes radioactive decay and becomes useless for the purpose. Because a cyclotron is very expensive to construct and operate, the use of PET is generally limited to major medical facilities.

The isotope of arsenic having an atomic weight of 72 has potential for use as a PET agent. It has a 26.5 hour half-life, emits a 2.5 MeV positron, and is formed by the radioactive decay of selenium having an atomic weight of 72. Arsenic-containing bone, brain, and tumor seeking substances already exist. The versatile chemistry of arsenic will permit the synthesis of many potentially valuable PET radiopharmaceuticals. Compounds such as arsenic analogs of phenothiazines will be useful for PET receptor binding studies. Such compounds will also allow the study of the modes of action and metabolism of these tranquilizers and possibly lead to a better understanding of schizophrenia. An organic arsenite has been shown to cross the blood-brain barrier, thus permitting imaging of cerebral tumors and trauma. Methods are now being developed to label monoclonal antibodies with arsenic so that tumor-specific PET imaging may be accomplished. It is believed that use of As-72 will permit early detection of lung cancer by allowing very small tumors to be shown on PET images. The potential utility of arsenic-72 is not limited to PET and other nuclear medicine applications. It is believed that there will be numerous applications in toxicology, metabolism, biochemistry, biology, and environmental science. As-72 will be useful both where arsenic compounds may be used and as a tracer for addition to other compounds. Many of these applications will require a very high specific activity of the tracer isotope.

The present invention provides a method and apparatus for generating arsenic-72 at the site of PET imaging equipment without the use of massive and expensive equipment. It provides a solution to problems of other methods which require the use of difficult to handle gases, such as hydrogen fluoride, or involve steps which are quite difficult to automate. An electrochemical technique which has been used has not produced As-72 which is sufficiently free from selenium. The generator of this invention provides the radioactive isotope As-72 at the site of use by repetitively separating As-72 from a parent substance comprised of Se-72 which can be reused by simply allowing time for the As-72 to form after each separation. Without the present invention, As-72 would have to be transported to the point of use and used within about one day after its isolation from Se-72. The useful life of the parent substance of the present invention depends on the half-life of selenium-72, which is about 8.5 days, rather than on the half-life of As-72. It is expected that, with the methods and apparatus of the present invention, parent substance need be shipped to a location of use only about every four weeks. The generator will be used in a clinical laboratory on a routine basis and therefore must be reliable, easy to use, and safe with respect to radiation, and chemical and physical hazards. The product of the generator must be biologically sterile so that it provides a sterile and non-pyrogenic product for use within the human body, though there will be some uses as a tracer where sterility and non-pyrogenicity will not be required.

SUMMARY OF THE INVENTION

Methods and apparatus for producing selenium-72, separating it from its daughter isotope arsenic-72, and generating multiple portions of a solution containing arsenic-72 from a reusable parent substance comprised of selenium-72. The invention provides apparatus which can be located at a site where arsenic-72 is used, for purposes such as PET imaging, to produce arsenic-72 as needed, since the half-life of arsenic-72 is very short.

DETAILED DESCRIPTION OF THE INVENTION

Figure 1:
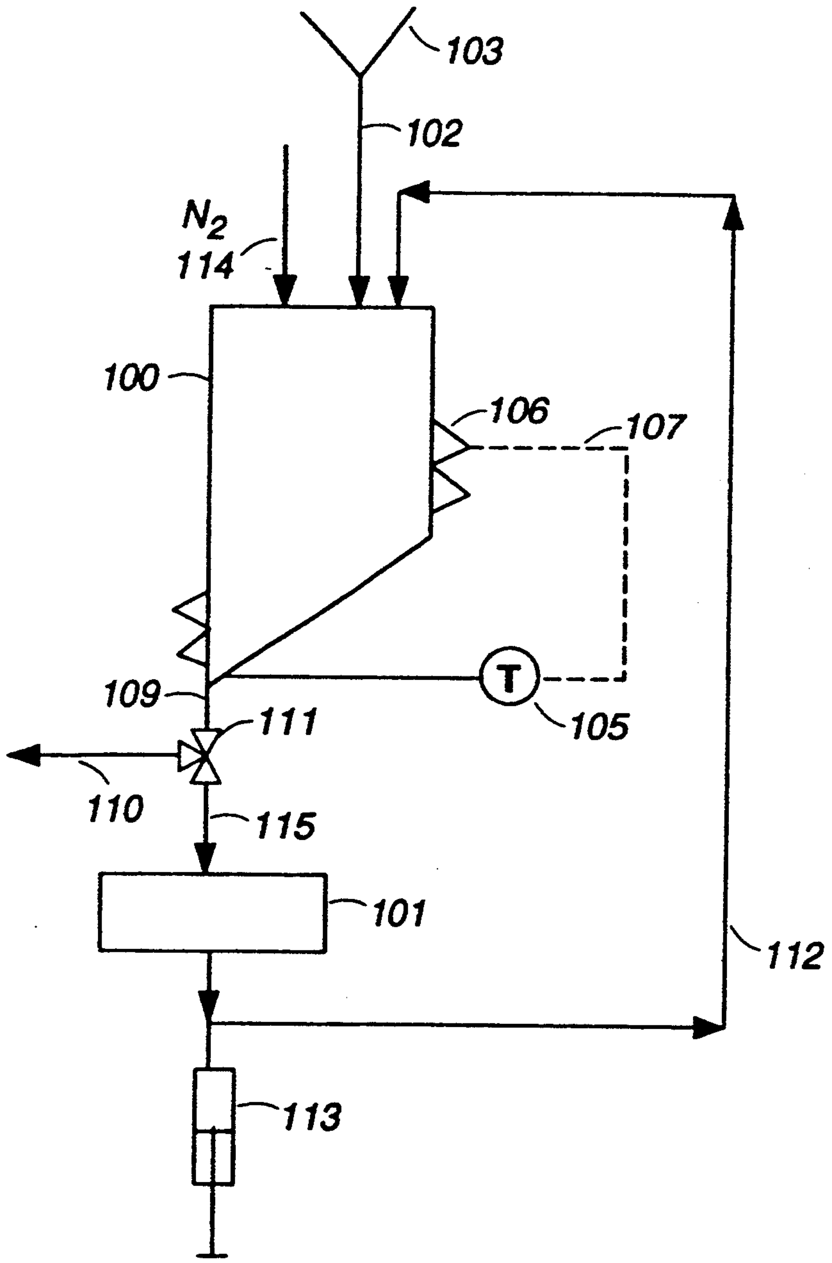
FIG. 1 is a schematic diagram of basic apparatus for separating arsenic-72 from selenium-72.

Selenium-72 and numerous other isotopes are produced by spallation reactions occurring when a rubidium bromide target is exposed to a proton beam. The proton beam used in experimentation for the present invention is produced at the Meson Physics facility at Los Alamos National Laboratory. The proton accelerator can deliver a beam of protons at an intensity of 1 milliamp and an energy of 800 MeV. Although a wide variety of studies take place in this facility, only a portion of the total proton beam is depleted by the experiments. Over three-fourths of the beam remains unused at the end of the experiments and continues toward the beam stop. Immediately in front of the beam stop is an isotope production facility that uses the proton beam to create radioisotopes from various target materials. Spallation reactions occur when accelerated protons from the beam strike the nucleus of a target atom and cause fragments of various sizes and energies to be ejected. The process generates extremely high radiation levels and raises temperatures of the targets to values as high as 1000° C., even though they are water cooled during exposure to the beam. Irradiated targets must be handled by means of the usual remote methods for radioactive substances. Separation of selenium from the target and other fragments of the spallation reactions takes place in an isolated and shielded location called a "hot cell". The work is done by means of remotely controlled mechanical manipulators behind an 18 inch thick leaded glass window. After the selenium is isolated, further handling of the selenium may be accomplished using much more modest radiation shielding.

In a paper by Grant et al , "Medium-Energy Spallation Cross Sections. 1. RbBr Irradiation With 800-MeV Protons," Int. J. of Applied Radiation and Isotopes, Vol. 33, pp 415–417 (1982), forty different isotopes have been identified as spallation products from irradiation of rubidium bromide. These are isotopes of yttrium, strontium, rubidium, bromine, selenium, arsenic, germanium, gallium, zinc, copper, cobalt, iron, manganese, chromium, vanadium, scandium, and beryllium.

To produce selenium-72, rubidium bromide is placed in a container consisting of a short length of ¾ or 3 inch diameter stainless steel pipe having stainless steel plates welded to each end. The container is welded shut after the substance is placed within it. The container is placed into an aluminum box which is placed in the path of the proton beam. Cooling water is circulated through the aluminum box to cool the rubidium bromide and container during radiation. In an experiment involving the present invention, a RbBr target, which weighed about 170 g, was exposed to the proton beam for about 790 hours and the average beam current for the exposure was about 750 microamperes. Approximate expected ranges of these values are 40 to 190 g, 170 to 800 hours of exposure, and 400 to 900 microamperes. The target was exposed to a total of about 592,500 microampere-hours and about $1.3\times10^{22}$ protons. It is estimated that 3.2 curies of selenium-72 were produced. A curie is the amount of a radioactive substance that undergoes $3.7\times10^{10}$ radioactive disintegrations per second. The mass of 3.2 curies of selenium-72 is about 15 micrograms. After irradiation, the target was held for about two weeks before further processing to allow its radioactivity to diminish.

The following was done in a hot cell. The container was cut open using a lathe. The open container with the RbBr was placed in a 600 mL beaker, a magnetic stirring bar was placed on the exposed RbBr surface, and the beaker was placed on a magnetic stirrer. About 100 ml of 4 M HCl was added to the beaker and it was stirred for 15 minutes. The resulting solution was poured into a 1 L Erlenmeyer flask and the procedure was repeated three more times with three approximately 100 mL portions of 4 M HCl placed in the beaker. The solution in the dissolution flask contained some undissolved matter from the target and flakes of stainless steel from the container. The flask was connected to a water-cooled glass condenser. The condenser was connected to a flask for collection of condensate which contained about 15 mL of $H_2O_2$ to trap As and had the feed tubing from the condenser running below the liquid level. The condensate flask was placed into a beaker containing ice and water. About 133 mL of 12 M HCl was added to the flask to bring the solution to about 6 M in HCl. Note that the solution was also about 2 M in bromide for a total halide molarity of about 8. The Erlenmeyer flask was stirred for about one hour to complete dissolution of its contents.

Then two mL of 0.03 M $H_2SeO_3$ (selenous acid), which contains about 5 mg of selenium, was added to the flask to act as a carrier. Selenic acid ($H_2SeO_4$) may also be used as a carrier. The added selenium is not radioactive and has the purpose of providing a sufficient amount of selenium for precipitation and filtration to take place.

Five mL of freshly-prepared 1.0 M hydrazine dihydrochloride ($N_2H_4{\cdot}2HCL$) was added to the flask and the contents of the flask were boiled for about 60 minutes until about 230 mL of liquid collected in the condensate flask. The volume reduction of the solution in the Erlenmeyer flask should be from about 30 to about 70%. A precipitate of elemental selenium formed in the dissolution flask while germanium chloride ($GeCl_4$) and arsenic chloride ($AsCl_3$) distilled over to the condensate flask. The arsenic in the condensate flask includes isotopes having atomic weights of 72 through 76. As the Erlenmeyer flask cooled, rubidium bromide precipitated out of the solution. 100 mL of water was added to redissolve the rubidium bromide, resulting in a fine black selenium precipitate in a clear yellow solution. The contents of the Erlenmeyer flask (including the magnetic stirring bar) were added to a 100 mL fine-frit Buchner funnel and the liquid was pulled through the funnel into a flask by vacuum, leaving the selenium in the funnel. The selenium was washed with several portions of water totalling about 250 mL. At this point, the Se is probably contaminated with traces of Co-56, Co-57, Co-58, As-73, and As-74. The washing step removes a portion of the contaminants.

The selenium precipitate contains Se in its naturally-occurring state, which is the carrier, Se-72, Se-73, and Se-75. Se-73 has a short half-life and decays quickly to As-73, which is removed as the chloride during the distillation step. There is virtually no Se-73 remaining behind after the distillation. Se-75 has a longer half life and decays to As-75, which is stable. Thus, the product As-72 will always also contain some As-75. The solution remaining after the Se precipitate is separated contains the isotopes mentioned above as spallation products except for Se, As, and Ge.

The Buchner funnel containing the Se precipitate was then placed on another vacuum flask and 15 mL of freshly prepared 6 M HCl/3% $H_2O_2$ at a temperature of about 50° C. was added to the funnel to dissolve the selenium, forming selenic acid. The temperature of the $HCl/H_2O_2$ can range from about 30° to about 70° C. The $HCl/H_2O_2$ was heated by the heat released upon dilution of 12 M HCl as the solution was prepared. Alternatively, the $HCl/H_2O_2$ solution can be heated before adding it to the funnel. Heating the solution increases the rate of dissolution of the Se. Dissolution took about 15 minutes. Vacuum was applied to the flask to pull the liquid through the filter and the filter was rinsed with about 25 mL portions of the hydrochloric acid/hydrogen peroxide solution. The solution contained about 12 millicuries/mL of selenium-72/arsenic-72 and about 28 millicuries/mL of Se-75 in a total solution volume of 120 mL.

In order to remove the contaminants mentioned above, Se was precipitated out of the solution and again dissolved as follows. The solution was heated for about one hour to destroy residual $H_2O_2$. Then, five mL of hydrazine dihydrochloride was added to the flask containing the solution and the resulting solution was boiled for about 15 minutes. Selenium precipitated out and was separated from the liquid using a fine-frit Buchner funnel. The selenium on the filter media of the Buchner funnel was washed with about 200 mL of water. The filtrate contained the contaminants (As and Co). The Se on the frit was dissolved by adding 25 mL of freshly prepared 6M HCl/3% $H_2O_2$ to the funnel. The HCl/$H_2O_2$ should be at a temperature of about 30° to about 70° C. After 15 minutes, the material in the Buchner funnel was pulled through into a flask by applying vacuum to the flask. The frit was washed with 75 mL of HCl/$H_2O_2$ and 20 mL of water. The total volume of 120 mL in the flask contained 1.0 curie of Se-72/As-72 and 2.7 curies of Se-75. No other radioisotopes were detected. This solution is a parent substance for use in an As-72 generator.

The method for generating multiple portions of As-72 has been performed in a hot cell using a relatively large amount of parent substance and on a smaller scale using Se-73 and As-75 as tracers and also using Se-72 and As-72 as tracers. Following is a description of the generator procedure using quantities which will be used in a commercial generator. The selenium solution must be stored for about two days to allow arsenic-72 to form, or grow-in, and to allow the hydrogen peroxide to decompose. It is necessary that the $H_2O_2$ be destroyed and this can also be done with heat or ultraviolet light.

Five mL of parent substance is added to a 60 mL fine frit Buchner funnel which is fitted with a heating jacket and mounted on a vacuum flask, or receiving vessel. Depending on the concentration of As-72, the amount parent substance used may be less than 5 mL. and 6M will be added to bring the volume up to 5 mL. The filter is covered and connected to a water-cooled condenser which discharges condensed material into a waste reservoir. 750 $\mu$L of 1.0 M hydrazine dihydrochloride is added to the funnel and the liquid in the funnel is agitated by bubbling nitrogen gas into it by means of a tapered glass tube or pipette tip. The solution is heated to about 70° C. and 100 $\mu$L of 0.03 M selenous acid is added to act as a carrier. The carrier is added only once to a parent substance and need not be added each time that the parent substance is processed to extract As-72. The solution is held at 70° C. for about 30 minutes until elemental Se precipitates out of the solution. Use of a temperature of from about 60 to about the boiling point of 6 M HCl and a short residence time of about 10 to about 35 minutes keeps the loss of arsenic which vaporizes off as $AsCl_3$ to a minimum of about 1 to 2%. The solution in the funnel is allowed to cool for a short time and vacuum is applied to pull the solution through the filter into the receiving vessel. About 0.75 mL of 15.4 M nitric acid is added to the receiver before the solution is filtered into it. The solution in the receiver is boiled to dryness, additional nitric acid is added, and the solution is again boiled to dryness. This procedure destroys excess hydrazine dihydrochloride. Dilute HCl (0.1 M) is added to the receiver to form the product arsenic-72 solution. This solution may be used to make arsenic-containing substances for uses such as are described above, including PET.

In order to dissolve the Se remaining in the funnel, 3 mL of 6.7 M HCl and a sufficient quantity of 30% hydrogen peroxide to make the resulting solution 6 M in HCl and containing 3% $H_2O_2$ is added to the funnel and heated to about 50° C. After the Se dissolves and is pulled through the frit, the funnel and frit are washed with small quantities of HCl and water. The solution is then stored so that grow-in of As-72 and decomposition of $H_2O_2$ can take place, so that additional product As-72 can be isolated from it.

The amount of Se in the recycled parent substance after As-72 is isolated from it is greater than 95% of the Se present before isolation of As-72. The amount of Se in the product As-72 is less than 0.1%.

FIG. 1 depicts apparatus which may be used in the practice of the present invention, as described in the above example. In order to generate multiple portions of a solution containing arsenic-72 from a reusable parent substance, it is placed into reactor 100. Hydrazine dihydrochloride and a carrier comprised of selenium are added to the contents of reactor 100 through additive funnel 103 and conduit 102. Agitation of the contents of reactor 100 is accomplished by bubbling nitrogen through the liquid. Nitrogen is added by means of conduit 114, which extends into reactor 100 and below the liquid level. The contents of reactor 100 are heated by electrical heating jacket 106. Temperature is sensed and the amount of heat applied is controlled by temperature sensor and controller 105, which provides a control signal to heater 106 by means of control lead 107. After a sufficient time for the reaction to take place, the material in reactor 100 is passed through conduit 109, three-way valve 111, and conduit 115 to separation means 101, where the solution containing As-72 is separated from the solid comprised of Se-72. The solution is passed out of separation means 101 and returned to reactor 100 by means of pump 113 and conduit 112. Pump 113 is depicted in FIG. 1 as a syringe pump. Product solution is treated to remove hydrazinium ion and then removed from reactor 100 by means of conduit 109, valve 111, and conduit 110. An HCl/$H_2O_2$ solution is then heated in reactor 101 and circulated through filter means 101 in order to dissolve the precipitated Se. When dissolution is complete, the solution is removed through conduit 110. This solution is stored to allow As-72 to grow-in and $H_2O_2$ to decompose.

Figure 2:
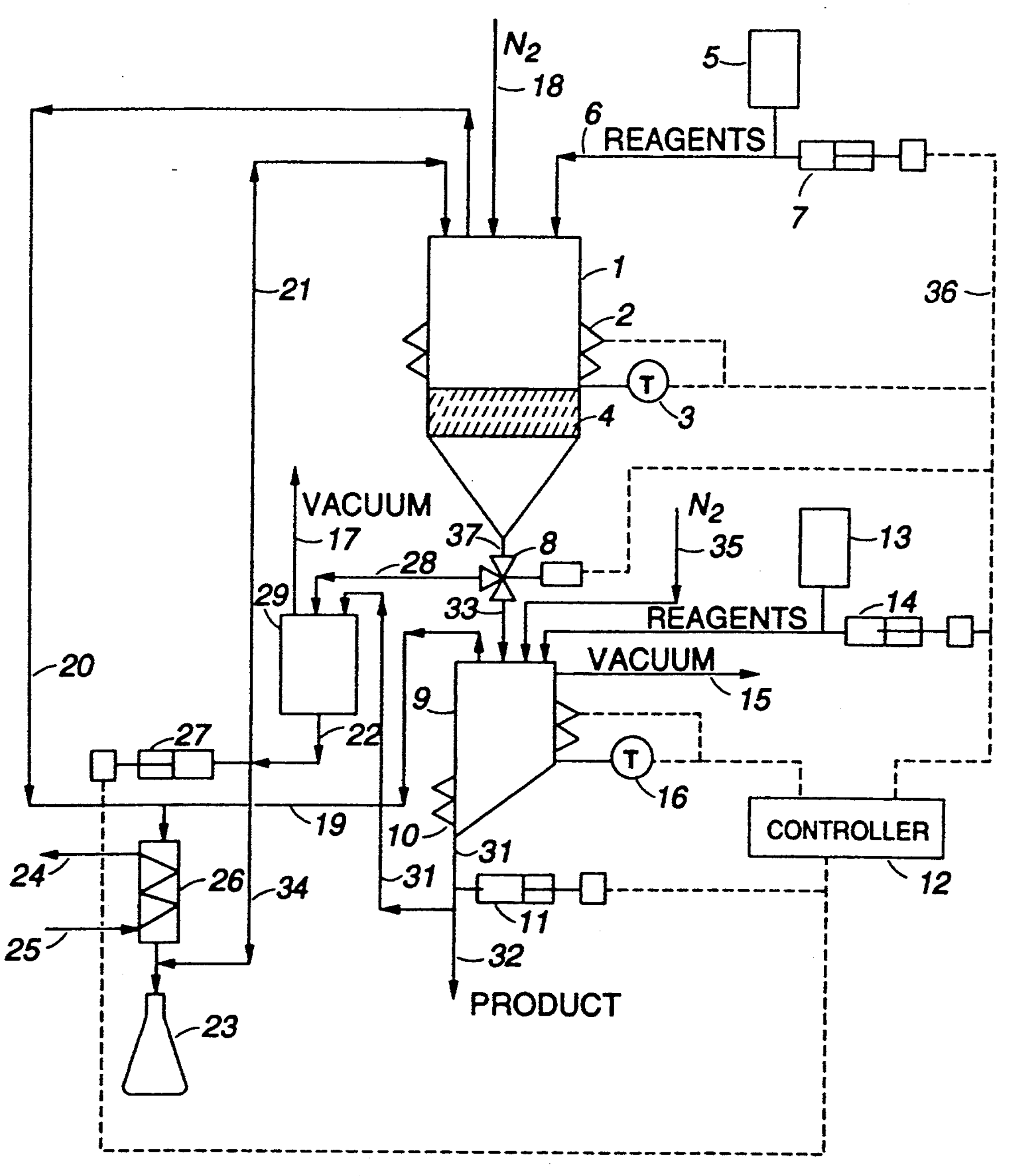
FIG. 2 is a schematic diagram depicting an automated system for generating arsenic-72 from a parent substance comprised of selenium-72.

FIG. 2 depicts an automated system for generating arsenic-72, as described in the above example. Reagents are stored in containers such as container 5 and supplied to reactor 1 by means of an apparatus such as syringe pump 7 and conduit 6. There may be a pump and conduit for each reagent container, as shown in FIG. 2, or several reagents may be transferred by a single pump with appropriate manifolding. Multiport valves and multiplex pumps may be used. Reagents to be used include hydrazine dihydrochloride, hydrochloric acid, selenic or selenous acid for use as a carrier, nitric acid, and hydrogen peroxide. The pumps have automatic actuators and are controlled by controller 12 by means of control leads such as control lead 36. Control signals from controller 12 and information transmitted to controller 12 are represented by dashed lines. A small computer with the necessary interface hardware may comprise controller 12. It will be programmed to time the process and initiate transfers of materials between components. The contents of reactor 1 may be heated by use of electrical heating element 2 and the temperature is controlled and adjusted by controller 12, which receives a signal indicating the temperature of the contents from temperature sensor 3. For example, the temperature of material in reactor 1 is controlled at about 70° C. when the reaction with hydrazine dihydrochloride is taking place. The contents of reactor 1 may be agitated by nitrogen gas bubbled into the liquid which is added by means of conduit 18. Though it is not shown, conduit 18 extends into reactor 1 and below the liquid level.

Parent substance located in parent reservoir 29 is transferred to reactor 1 by means of conduit 22, syringe pump 27, and conduit 21. Note also that a liquid in parent reservoir 27 may be transferred to waste reservoir 23 by means of conduits 22 and 34 and pump 27. Reactor 1 is similar to a Buchner funnel in that it contains a fine porous ceramic filter media 4. Liquid will not pass through the filter media solely by gravity unless a reduced pressure, or vacuum, is applied downstream of the filter media. The parent substance is reacted with hydrazine dihydrochloride and heated in reactor 1. Liquid in reactor 1 is passed through filter 4 and into receiver 9 via conduit 37, valve 8, and conduit 33. In order to pull liquid through filter 4, a vacuum is created in receiver 9 by means of vacuum conduit 15, connected to a vacuum pump (not shown). In a similar manner, liquid may be transferred from reactor 1 to parent reservoir 29 by means of conduit 37, valve 8, and conduit 28, utilizing vacuum supplied by means of conduit 17. After precipitated elemental Se is dissolved in reactor 1, the solution is transferred to the parent reservoir by this route. The solution remains in the parent reservoir for a time period sufficient to allow $H_2O_2$ to decompose and As-72 to grow-in, thus forming the parent substance from which additional As-72 may be recovered.

Receiver 9 is heated and the temperature of its contents is controlled in the same manner as is done with reactor 1 using heating element 10, temperature sensor 46, and controller 12. Reactor 1 and receiver 9 are connected to condenser 26 by means of conduits 19 and 20. Cooling water is passed through condenser 26 by means of conduits 24 and 25. Vapors from reactor 1 and receiver 9 which are condensed in condenser 26 discharge into waste reservoir 23, which may be placed in an ice water bath (not shown). Nitrogen for agitation of the contents of receiver 9 is added by means of conduit 35 in the same manner that nitrogen is added to reservoir 1. Reagents are added to receiver 9 in the same manner as they are added to reservoir 1 by means of apparatus such as container 13, syringe pump 14, and conduit 30.

Arsenic-72 in solution in receiver 9 is treated with nitric acid to remove hydrazinium ion by evaporating the liquid to dryness one or more times and then reconstituting with HCl to form the product solution. The contents of receiver 9 may be withdrawn through conduit 31 and transferred to parent reservoir 29 by means of syringe pump 11 or to another location through conduit 32. The contents may also be withdrawn by means of a hand operated syringe (not shown).

The apparatus of FIGS. 1 and 2 contain check valves and stop valves as required to isolate the various substances from one another. As noted above, radiation shielding must be provided for apparatus containing Se-72 and As-72. Parent substance may be shipped in containers certified by the U.S. Department of Transportation. The parent substance may be transferred to the parent reservoir or the shipping container may have conduits attached so that it can be incorporated into the generator apparatus and used as the parent reservoir. The volume of parent substance which is shipped is expected to be from about 0.5 mL to about 5 mL.

In the commercial As-72 generator, a gamma photon detector may be used to assay the product As-72 solution to determine that the amount of Se present does not exceed the maximum permitted for injection into patients and to determine the amount of As-72 which is present in the product solution.

As-72 produced in accordance with this invention has been tested in PET imaging equipment by comparing artifacts within the detector system with artifacts occurring when fluorine-18 is imaged. The tests were successful.

What is claimed is:

1. A method of producing selenium isotopes comprising:

a. exposing rubidium bromide to a proton beam of sufficient energy to cause spallation of the rubidium bromide for a time period sufficient for formation of selenium;

b. dissolving said rubidium bromide and spallation products in hydrochloric acid to form a solution;

c. adding hydrazine dihydrochloride to said solution;

d. heating said solution with said additive until its volume is reduced to from about 30 to about 70% of the volume before heating is started;

e. adding water to said volume-reduced solution as necessary to dissolve solid material which is not selenium which precipitates as said volume-reduced solution cools; and f. separating selenium in solid form from said cooled solution.

2. The method of claim 1 where a carrier comprised of selenium is added to said solution before said hydrazine dihydrochloride is added.

3. The method of claim 1 where contaminants are removed from selenium in solid form by redissolving said selenium and reprecipitating said selenium.

* * * * *